(12) United States Patent
Kataoka et al.

(10) Patent No.: US 7,737,587 B2
(45) Date of Patent: Jun. 15, 2010

(54) MOTOR

(75) Inventors: Nakaba Kataoka, Kyoto (JP); Takayuki Migita, Kyoto (JP); Hidehiro Haga, Kyoto (JP)

(73) Assignee: Nidec Corporation, Kyoto (JP)

( * ) Notice: Subject to any disclaimer, the term of this patent is extended or adjusted under 35 U.S.C. 154(b) by 322 days.

(21) Appl. No.: 12/039,819

(22) Filed: Feb. 29, 2008

(65) Prior Publication Data

US 2008/0211332 A1   Sep. 4, 2008

(30) Foreign Application Priority Data

Mar. 1, 2007   (JP) ............................. 2007-051335

(51) Int. Cl.
*H02K 11/00* (2006.01)

(52) U.S. Cl. .................. 310/71; 310/68 A; 310/68 B; 310/68 C; 310/68 D; 174/68.2

(58) Field of Classification Search ............... 174/68.2; 310/71, 68 A, 68 B, 68 C, 68 D
See application file for complete search history.

(56) References Cited

U.S. PATENT DOCUMENTS

| 6,380,648 | B1 | 4/2002 | Hsu | |
|---|---|---|---|---|
| 6,600,244 | B2* | 7/2003 | Okazaki et al. | 310/71 |
| 7,514,829 | B2* | 4/2009 | Otsuji et al. | 310/71 |
| 7,579,732 | B2* | 8/2009 | Yamaguchi et al. | 310/71 |
| 7,663,277 | B2* | 2/2010 | Kinoshita et al. | 310/71 |
| 2006/0068617 | A1* | 3/2006 | Migita et al. | 439/76.2 |
| 2006/0138883 | A1* | 6/2006 | Yagai et al. | 310/71 |
| 2007/0278876 | A1* | 12/2007 | Haga et al. | 310/71 |
| 2009/0058215 | A1* | 3/2009 | Murakami et al. | 310/208 |

FOREIGN PATENT DOCUMENTS

| CN | 1274979 | A | | 11/2000 |
|---|---|---|---|---|
| JP | 06006950 | | * | 1/1994 |
| JP | 06-233483 | A | | 8/1994 |
| JP | 2004-157056 | A | | 6/2004 |
| JP | 3614380 | B2 | | 1/2005 |
| JP | 3663401 | B2 | | 6/2005 |

OTHER PUBLICATIONS

Kataoka et al.: "Motor," U.S. Appl. No. 12/039,822, filed Feb. 29, 2008.
Kataoka et al.: "Motor," U.S. Appl. No. 12/039,825, filed Feb. 29, 2008.

* cited by examiner

*Primary Examiner*—Quyen Leung
*Assistant Examiner*—Terrance Kenerly
(74) *Attorney, Agent, or Firm*—Keating & Bennett, LLP (57) ABSTRACT

A motor having a busbar unit which is accommodated in a housing along with an armature includes a relay wherein the connection between the armature and the relay is secured. By virtue of such a configuration, reliability of the connection between the armature and the relay is improved. In the busbar unit, a plurality of first busbars and a plurality of second busbars each having a substantially arcuate shape are arranged so as to be circumferentially spaced apart from one another. The first busbars do not overlap with the second busbars in the axial and radial directions thereby reducing the dimensions of the motor in the axial and radial directions.

19 Claims, 11 Drawing Sheets

MOTOR

BACKGROUND OF THE INVENTION

1. Field of the Invention

The present invention relates to a motor.

2. Description of the Related Art

Conventionally, hydraulic power steering is used in a vehicle such as a passenger car or the like to assist an operator in maneuvering the vehicle. The hydraulic power steering apparatus uses a pump operated by an engine of the vehicle to generate a force to assist the operator in steering the vehicle. In recent years, electric power steering which uses a motor operated by a vehicle battery has become available. Such a system is more power efficient than the conventional hydraulic power steering.

The motor used in such an electric power steering system is expected to operate reliably for a long period of time in various environments. In order to achieve the expected durability and reliability, the motor includes multiple layers of security features.

For example, a power steering unit which includes a control unit having a block mechanism operable to block the electric current conducted to a motor in case of emergency situations is available. Such a control unit is arranged via a heat sink at one axial end of the motor having a substantially cylindrical shape which includes a cylindrical stator and a rotor arranged inside the stator. Such a motor includes a sensor which detects an angular position of the rotor relative to the stator.

In such a motor, terminals having a substantially annular shape for connecting the coils to an external power source may be retained by a holder and arranged at an upper area of the stator or the rotor, wherein a resolver which detects the rotary position of the rotor is arranged above the holder.

In general, when such a block mechanism is arranged inside the control unit and outside of the motor, wiring is arranged between the motor and the control unit, and the block mechanism and the stator. However, when external shocks and/or vibrations are applied to the motor, the wiring between the motor and the control unit may be damaged which compromises the reliability of the motor.

Also, such a motor is expected to have small dimensions in order to improve fuel efficiency and for environmental purposes.

SUMMARY OF THE INVENTION

In order to overcome the problems described above, preferred embodiments of the present invention provide a motor including a stator including an armature, a rotor portion including a field magnet which generates, along with the armature, a torque centered about a central axis, a bearing mechanism rotatably supporting the rotor portion with respect to the stator portion centered about the central axis, a busbar unit arranged at one axial side to connect the armature to an external power source, and a housing accommodating therein the stator portion, the rotor portion, the bearing mechanism, and the busbar unit. The armature includes a plurality of teeth arranged in a circumferential direction centered about the central axis, an insulator arranged to cover a surface of each tooth, and a plurality of coils formed by winding a wire around corresponding teeth via the insulator, the busbar unit includes a relay operable to control a drive current conducted to the armature from the external power source, a plurality of first busbars arranged to connect the coils and the external power source, a plurality of second busbars arranged to connect the coils and the relay, and a busbar holder arranged to retain the first busbars and the second busbars in a non-contact manner between the first busbars and the second busbars. Each first busbar includes at least one first terminal at one end of each wire forming the coils, each second busbar includes at least one second terminal at another end of each wire forming the coils, and the busbar holder has a substantially annular shape or a substantially arcuate shape centered about the central axis and is made of an insulating material.

By virtue of such a configuration, reliability of the motor is improved.

Other features, elements, steps, characteristics and advantages of the present invention will become more apparent from the following detailed description of preferred embodiments thereof with reference to the attached drawings.

DETAILED DESCRIPTION OF PREFERRED EMBODIMENTS

Note that in the description of preferred embodiments of the present invention herein, terms such as upper, lower, left, right, upward, downward, top, and bottom for describing positional relationships between respective members and directions merely indicate positional and directions in the drawings. Such terms do not indicate positional relationships and directions of the member mounted in an actual device. Also note that reference numerals, figure numbers, and supplementary descriptions are shown below for assisting the reader in finding corresponding components in the description of the preferred embodiments below to facilitate an understanding of the present invention. It is to be understood that these expressions in no way restrict the scope of the present invention.

Figure 1:
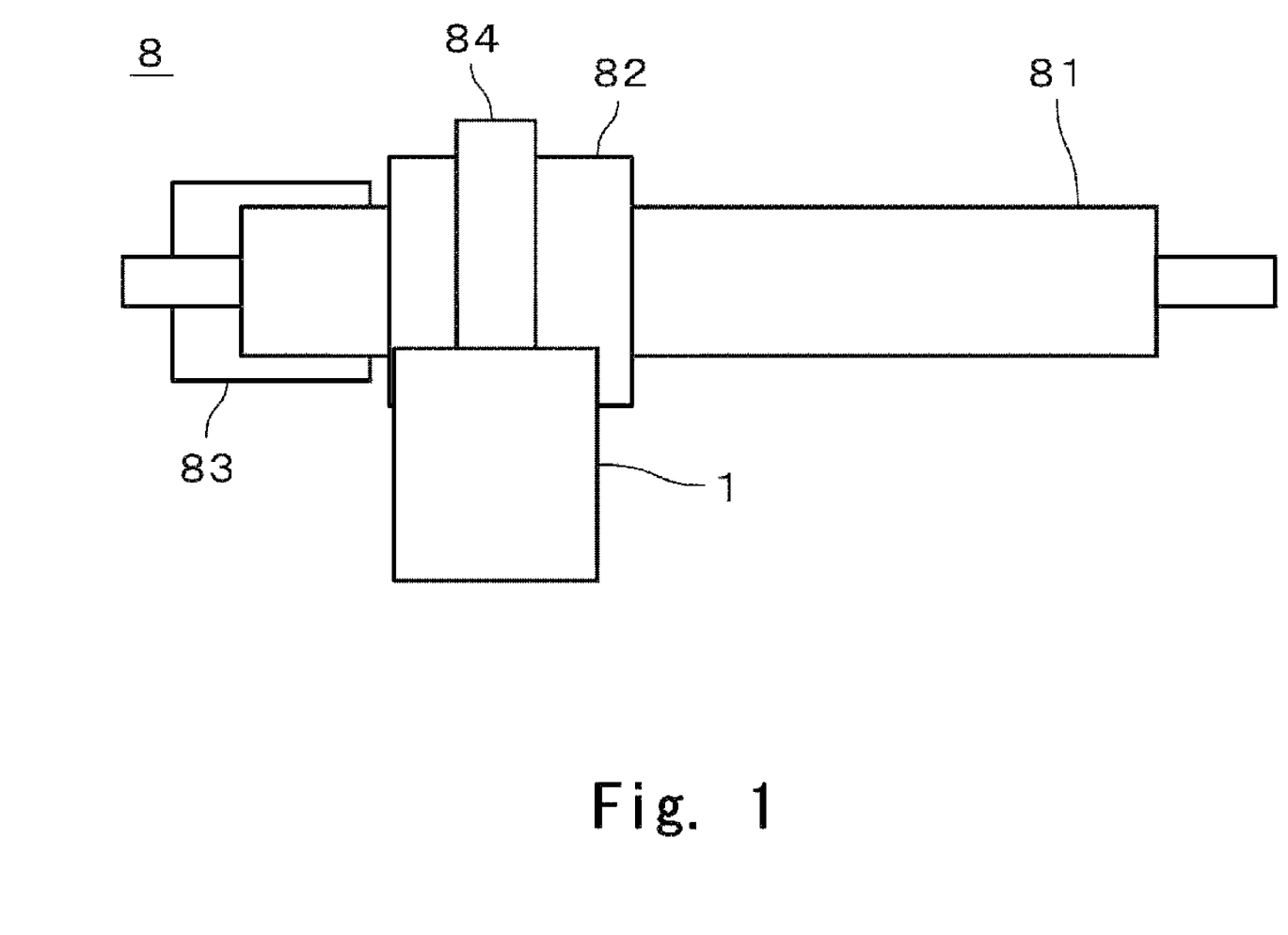
FIG. 1 is a schematic diagram of a power steering unit including a motor according to a first preferred embodiment of the present invention.

FIG. 1 is a schematic diagram of a power steering unit 8 (e.g., EPS (Electric Power Steering)) having a motor 1 according to a first preferred embodiment of the present invention. The power steering unit 8 is preferably used to assist an operator (e.g., driver) in maneuvering a vehicle such as a passenger car.

As shown in FIG. 1, the power steering unit 8 preferably includes a shaft portion 81 which is connected to a steering wheel and/or a steering mechanism; a sensor 82 which detects a force applied to the steering wheel; a control unit 83 which, based on an output from the sensor 82, calculates an amount of force necessary to assist the operator; the motor 1 which, based on an output from the control unit 83, generates a necessary torque; and a deceleration mechanism 84 which transmits the torque to the steering mechanism.

In a vehicle having the power steering unit 8, the motor 1 of the power steering unit 8 is activated by the force applied to the steering wheel by the operator. Then the torque generated by the motor 1 assists the steering of the vehicle thereby allowing the operator to steer the vehicle with a relatively small force without directly relying on an engine output of the vehicle.

Figure 2:
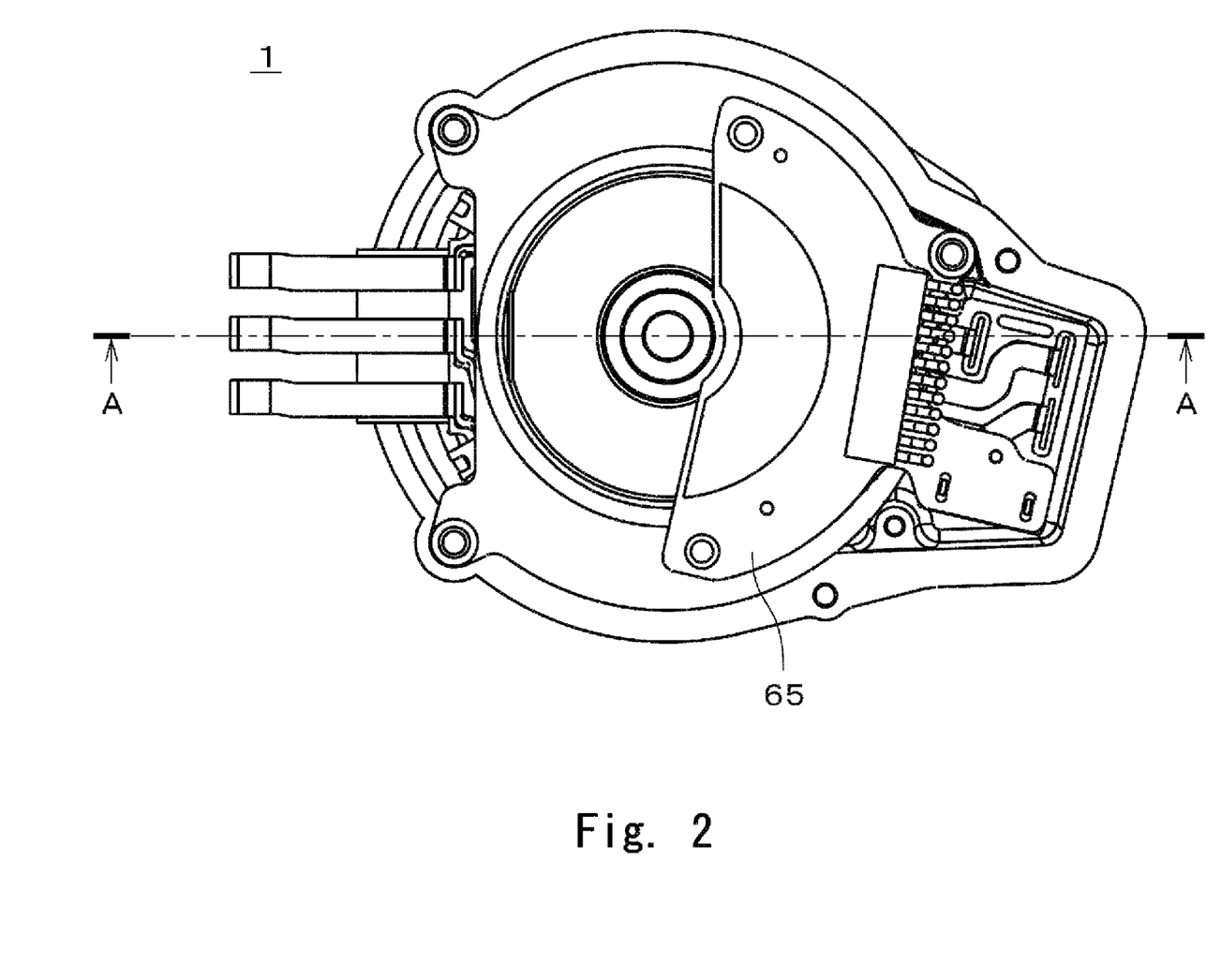
FIG. 2 is a schematic plan view of the motor according to the first preferred embodiment of the present invention.
Figure 3:
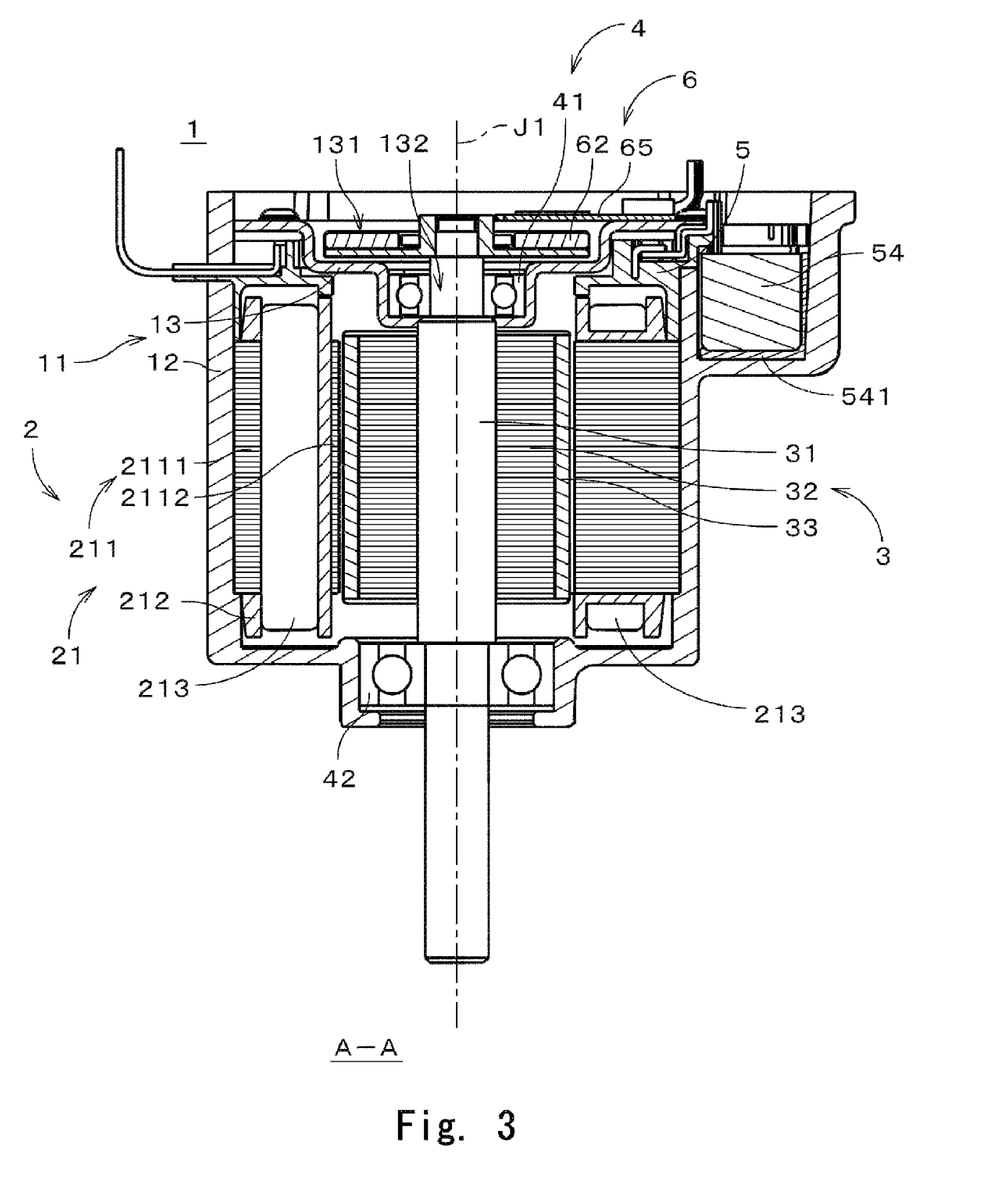
FIG. 3 is a schematic cross-sectional view of the motor according to the first preferred embodiment of the present invention.

FIG. 2 is a schematic plan view of the motor 1. FIG. 3 is a schematic cross-sectional view taken along a line A-A of the motor 1 shown in FIG. 2. The motor 1 is preferably a three phase motor activated by a three phase alternating current.

As shown in FIG. 3, the motor 1 which is an inner rotor type motor preferably includes a stator portion 2 which is a fixed assembly, a rotor portion 3 which is a rotatable assembly, a bearing mechanism 4 which rotatably supports the rotor portion 3 with respect to the stator portion 2 centered about the central axis J1, a busbar unit 5 which connects an armature 21 of the stator portion 2 to an external power source, and a sensor 6 which magnetically detects an angular position centered about the central axis J1 of a rotor core 32 (described below) of the rotor portion 3 with respect to the stator portion 2. Note that in the description herein, the busbar unit 5 and the sensor 6 are preferably arranged axially above the armature 21.

The motor 1 also preferably includes a housing 11 which has a substantially cylindrical shape with a bottom and accommodates therein the stator portion 2, the rotor portion 3, the bearing mechanism 4, and the busbar unit 5. The housing 11 preferably includes a housing body 12 which preferably has an opening at an upper side thereof, and a lid portion 13 which is arranged between the armature 21 and the sensor 6 so as to close the opening of the housing body 12. The housing body 12 is preferably made of an aluminum alloy by die casting or the like (i.e., aluminum die cast). The lid portion 13 is preferably made by pressing a magnetic steel plate. The lid portion 13 preferably includes a first concave portion 131 which is concaved downwardly from the lid portion 13, and a second concave portion 132 which is arranged radially inward of the first concave portion 131 and is also concaved downwardly.

The stator portion 2 preferably includes the armature 21 which is arranged at an inner circumferential surface of the housing body 12 by a deformation process such as heat shrinking, or adhering or the like. The armature 21 preferably includes a stator core 211 which is formed by laminating a plurality of thin silicon steel plates. The stator core 211 preferably includes a core back 2111 having an annular shape, and a plurality (for example, nine in the present preferred embodiment) of teeth 2112 each extending from the core back 2111 toward the central axis J1. Note that the stator core 211 preferably includes a plurality of multi-segment cores each including a tooth 2112 (for example, a total of nine segments in the present preferred embodiment). According to the stator core 211 of the present preferred embodiment, an outer circumferential portion of the core back 2111 preferably includes a concave portion which engages with a protrusion arranged at an inner circumferential surface of the housing body 12 in order to minimize circumferential movement of the stator core 211. The concave portion is also used as a position determiner for a plurality of first Hall elements (three in the present preferred embodiment) 641 and a plurality of second Hall elements (two in the present preferred embodiment) 642 (see FIG. 7) with respect to a sensor magnet 62 (described below) when the first Hall elements 641 and the second Hall elements 642 are attached to the circuit board 65 when the lid portion 13 of the housing 11 is attached to the housing body 12.

The armature 21 preferably includes an insulator 212 which is made of an insulating material covering a surface of the teeth 2112, and a plurality (for example, nine in the present preferred embodiment) of coils 213 which are formed by winding a wire in a concentrated manner around corresponding teeth 2112 via the insulator 212.

In the motor 1, three coils 213 corresponding to a U-phase of a drive current, three coils 213 corresponding to a V-phase of the drive current, and three coils 213 corresponding to a W-phase of the drive current are connected to corresponding electrodes of the external power source. In the present preferred embodiment, the three coils 213 corresponding to the U-phase are connected in a parallel manner to the U-phase electrode of the external power source (remaining coils 213 are connected in a similar manner).

The rotor portion 3 preferably includes a shaft 31 centered about the central axis J1, the rotor core 32 which is arranged around the shaft 31, and a field magnet 33 adhered to an outer circumferential surface of the rotor core 32. The rotor core 32 is preferably formed by laminating a plurality of thin silicon steel plates. In the motor 1, the field magnet 33 is arranged radially inward of the armature 21 centered about the central axis J1. The torque centered about the central axis J1 is generated between the armature 21 and the field magnet 33.

The bearing mechanism 4 preferably includes a first bearing portion 41 which is accommodated in the second concave portion 132 of the lid portion 13, and a second bearing portion 42 which is arranged at a substantially central portion of a bottom of the housing body 12 and which is concaved downwardly. Note that according to the present preferred embodiment, the first bearing portion 41 and the second bearing portion 42 are preferably ball bearings. A portion of the shaft 31 preferably protrudes upwardly from the lid portion 13 via a central opening in the second concave portion 132. The shaft 31 is rotatably supported by the first bearing portion 41 and the second bearing portion 42.

Figure 4:
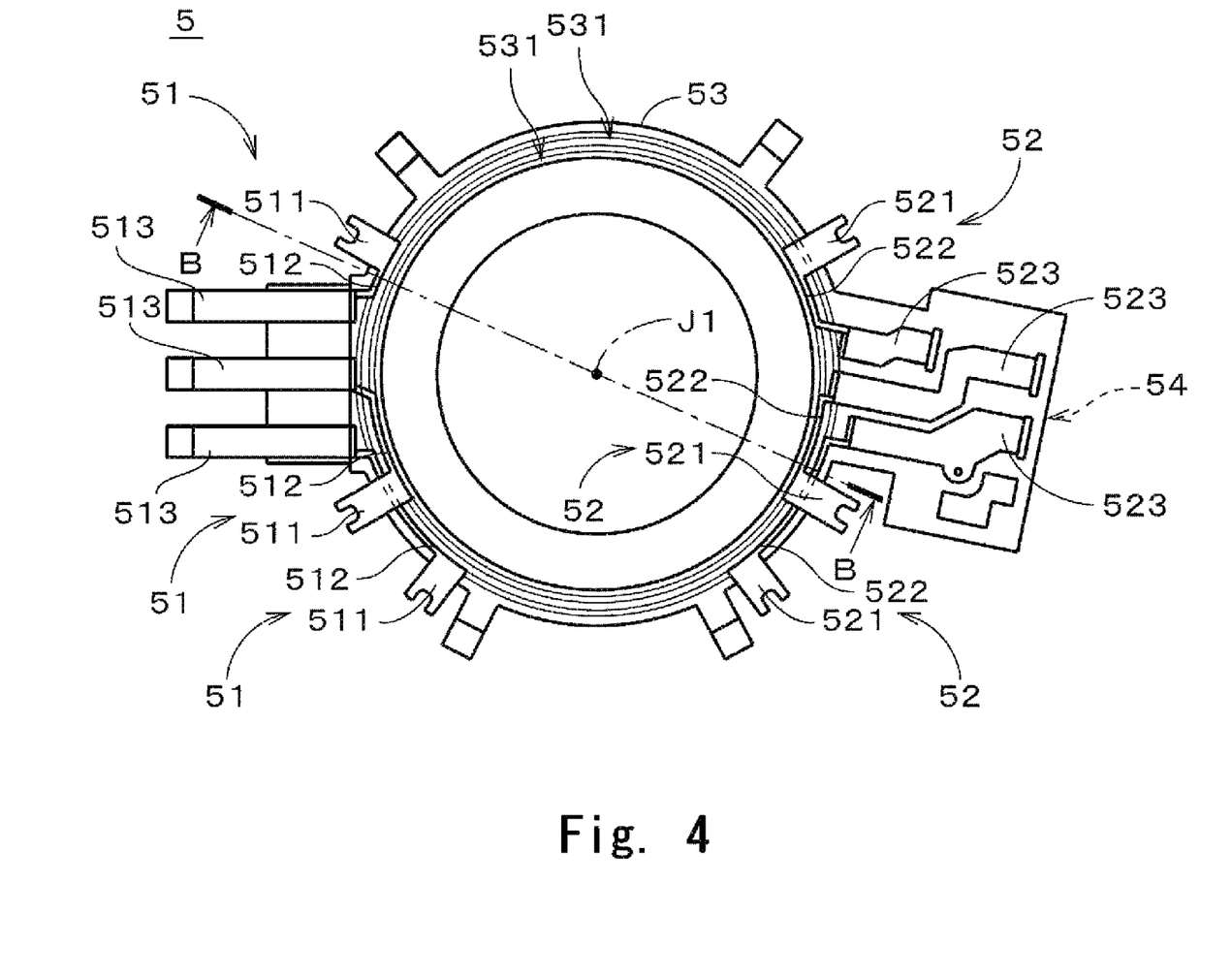
FIG. 4 is a schematic plan view of a busbar unit according to the first preferred embodiment of the present invention.
Figure 5:
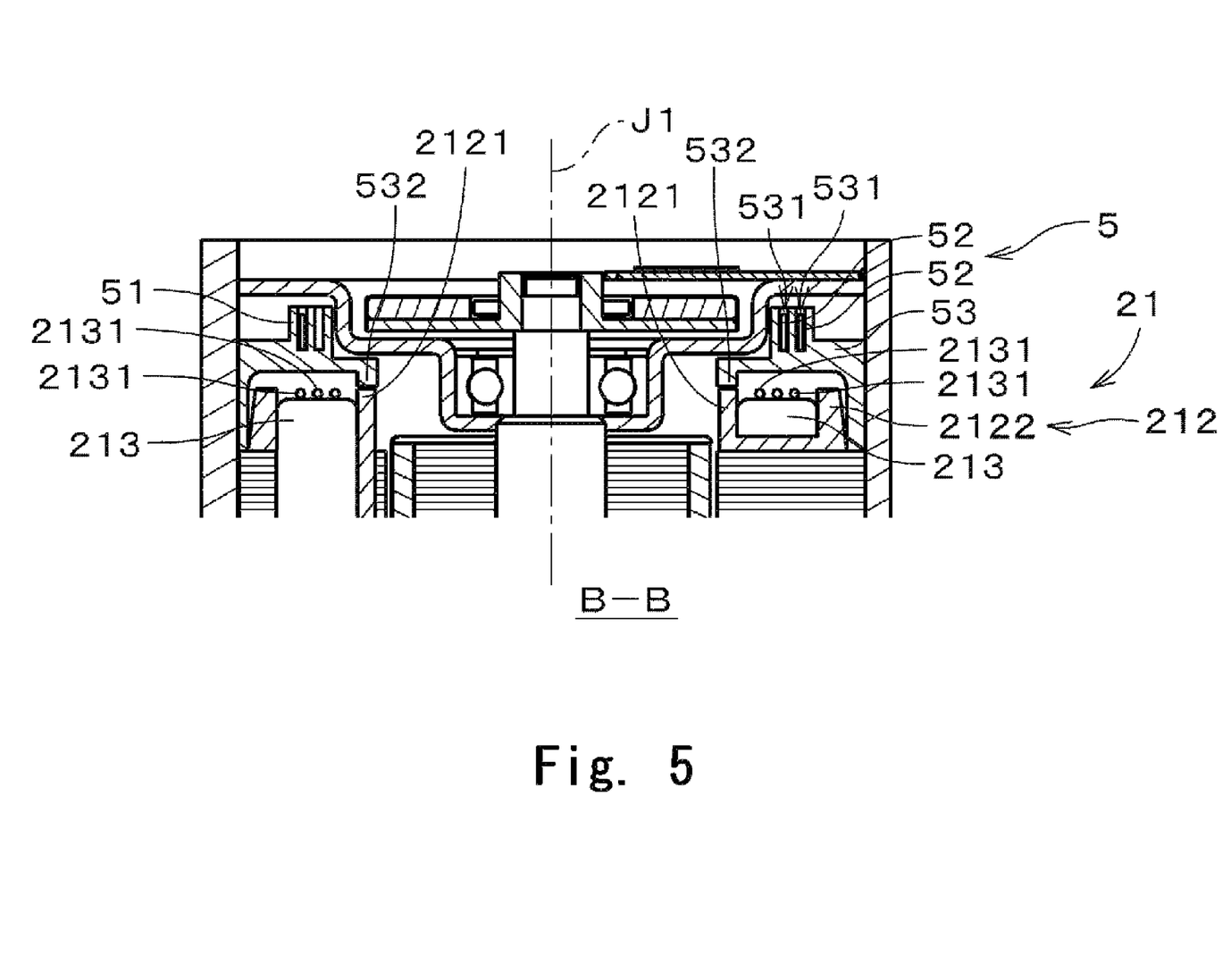
FIG. 5 is a schematic cross-sectional view of the busbar unit according to the first preferred embodiment of the present invention.

FIG. 4 is a schematic plan view of the busbar unit 5. FIG. 5 is a schematic cross-sectional view taken along a line B-B of the busbar unit 5 shown in FIG. 4. As shown in FIGS. 4 and 5, the busbar unit 5 preferably includes a plurality of first busbars 51 and a plurality of second busbars 52 which are made of a conductive material, and a busbar holder 53 which is made of an insulating material. The busbar holder 53 preferably retains the first busbars 51 and the second busbars 52 in a non-contact manner between the first busbars 51 and the second busbars 52. As shown in FIG. 4, a number of the first busbars 51 and a number of the second busbars 52 each equal the number (for example, three in the present preferred embodiment) of phases of the drive current conducted to the armature 21 from the external power source.

The busbar unit 5 preferably includes, as shown in FIGS. 3 and 4, a relay 54 which is operable to control the drive current conducted to the armature 21 from the external power source. To be more specific, the relay 54 preferably blocks the connection between the external power source and the armature 21 when the coil 213 is damaged (e.g., occurrence of a short circuit, etc.) in order to minimize an electromagnetic lock or the like. As shown in FIG. 3, the housing body 12 having a substantially cylindrical shape preferably includes a protruding portion arranged near the opening which protrudes radially outwardly and accommodates therein the relay 54. The relay 54 is preferably arranged at an inner circumferential surface of the housing body 12 via an adhesive layer 541.

In the power steering unit 8, the external power source is electrically connected to the armature 21 to which the drive current is conducted from the external power source. When an electromagnetic lock, in which the rotor core 32 is locked due to a magnetic force of the armature 21, occurs when an abnormality (e.g., a malfunction of a switch for the drive current, or the like) of a control signal controlling the drive current is sensed, the relay 54 disconnects a neutral point of the armature 21 in order to release the electromagnetic lock. By virtue of such a configuration, the steering mechanism of the vehicle will not be locked, and therefore, the operator is allowed to operate the vehicle safely.

As shown in FIGS. 4 and 5, the busbar holder 53 preferably has a substantially annular shape centered about the central axis J1. Also, the busbar holder 53 preferably includes a pair of groove portions 531 which are concentric with one another at an axially upper portion thereof. The first busbars 51 and the second busbars 52 each having a substantially arcuate shape centered about the central axis J1 preferably include a surface which extends in the axial direction. To be more specific, each busbar 51, 52 includes a substantially cylindrical shape extending along the central axis J1.

As shown in FIG. 4, the three second busbars 52 of the busbar unit 5 are arranged near the relay 54, and the three first busbars 51 are arranged at an opposite end from the relay 54 across the central axis J1. The three first busbars 51 and the three second busbars 52 are arranged so as to be spaced evenly apart from one another in the circumferential direction.

The first busbars 51 each preferably include a first terminal 511 which is connected to an end portion of the wire forming the coils 213 (see FIG. 3), a first busbar body 512 having a substantially arcuate shape at which the first terminal 511 is arranged, and a connecting portion 513 which extends radially outwardly from the first busbar body 512 so as to be connected to the external power source. Also, the second busbars 52 each preferably include a second terminal 521 which is connected to an end portion of the wire forming the coils 213, a second busbar body 522 having a substantially arcuate shape at which the second terminal 521 is arranged, and a relay connecting portion 523 which extends radially outwardly from the second busbar body 522 so as to be connected to the relay 54.

According to the busbar unit 5 of the present preferred embodiment, the connecting portions 513 of the three first busbars 51 are preferably arranged close to one another. The first busbar body 512 of one of the first busbars 51 preferably extends, in a clockwise direction from the connecting portion 513, in the groove portion 531 which is arranged furthest from the central axis J1. As for the other two first busbar bodies 512, one of the two preferably extends in the groove portion 531 arranged at an outer side of the busbar holder 53, and the other of the two preferably extends in the groove portion 531 arranged at an inner side of the busbar holder 53 both extending in a counter clockwise direction from the connecting portion 513. The two first busbar bodies 512 include portions overlapping in the radial direction.

Also, the relay connecting portions 523 are arranged near one another. One of the second busbar bodies 522 arranged in the groove portion 531, which is arranged at an inner side of the busbar holder 53, extends from the relay connecting portion 523 in a counter clockwise direction. Another second busbar body 522 arranged in the groove portion 531 of an outer side of the busbar holder 53 preferably extends in the clockwise direction with respect to the relay connecting portion 523, while the third busbar body 522 arranged in the groove portion 531 of an inner side of the busbar holder 53 preferably extends in the clockwise direction with respect to the relay connecting portion 523. Note that the aforementioned two second busbar bodies 522 are arranged to overlap each other in the radial direction.

As described above, according to the busbar unit 5 of the present preferred embodiment, all three first busbars 51 are arranged so as not to overlap in the radial direction. Also, all three second busbars 52 are arranged so as not to overlap in the radial direction. By virtue of such a configuration, dimensions of the busbar holder 53 are reduced in the radial direction.

According to the motor 1 of the present preferred embodiment, the three wires forming the coils 213 corresponding to each phase of the drive current (for example, nine wires in the present preferred embodiment) each include an end portion connected to the first terminal 511 of the corresponding first busbar 51, and another end portion connected to the second terminal 521 of the corresponding second busbar 52, and to the relay 54 via the second busbar 52.

Figure 6:
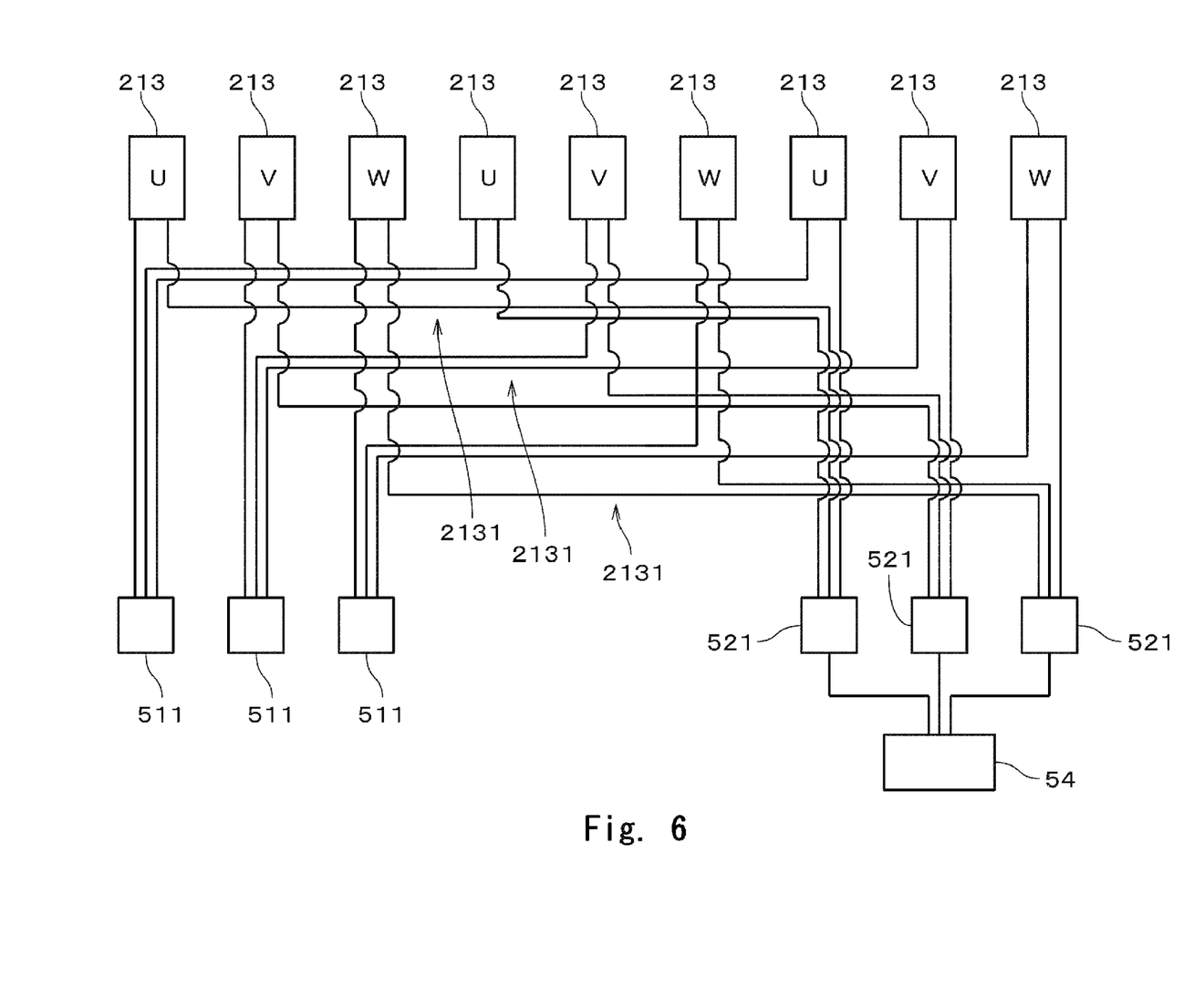
FIG. 6 is a schematic diagram of connections between coils, connecting wire portions, and terminals according to the first preferred embodiment of the present invention.

FIG. 6 is a schematic diagram of a plurality of connecting wire portions 2131 of the wires connecting the nine coils 213 of the armature 21 to the three first terminals 511 and to the three second terminals 521 of the busbar unit 5. Note that letters (U, V, and W) denoted in FIG. 6 indicate the corresponding phases of the drive current. As can be seen in FIG. 6, according to the motor 1 of the present preferred embodiment, three coils 213 corresponding to the three phases of the drive current are arranged in a parallel manner. The connecting wire portions 2131 are, as shown in FIG. 5, arranged in a space between the coils 213 and the busbar unit 5.

Also, the motor 1 according to the present preferred embodiment preferably includes at a radially inner side of the coils 213 an inner side protruding portion which preferably includes a plurality of first inner side protruding portions 2121 arranged at the insulator 212 and second inner side protruding portions 532 arranged at the busbar holder 53. The first inner side protruding portions 2121 each preferably having a substantially annular shape are preferably arranged at a radially inner side of the coils 213 in a manner protruding toward the busbar unit 5. Also, the second inner side protruding portions 532 having a substantially annular shape are preferably arranged at the radially inner side of the coils 213 in a manner protruding toward the first inner side protruding portions 2121. Also, a radially inner side of the connecting wire portions 2131 is covered by the inner side protruding portion.

According to the motor 1 of the present preferred embodiment, an axial distance between the first inner side protruding portions 2121 and the second inner side protruding portions 532 is preferably smaller than a diameter of the connecting wire portion 2131. Also, an axially top end of the first inner side protruding portions 2121 is preferably nearer to the coils 213 than to the busbar holder 53.

According to the armature 21 of the present preferred embodiment, the insulator 212 preferably includes a plurality of outer side protruding portions 2122 arranged in a substantially annular shape at a radially outer side of the coils 213. The outer side protruding portions 2122 preferably protrude toward the busbar holder 53. Also, an axially top end of the outer side protruding portions 2122 is preferably nearer to the coils 213 than to the busbar holder 53.

Figure 7:
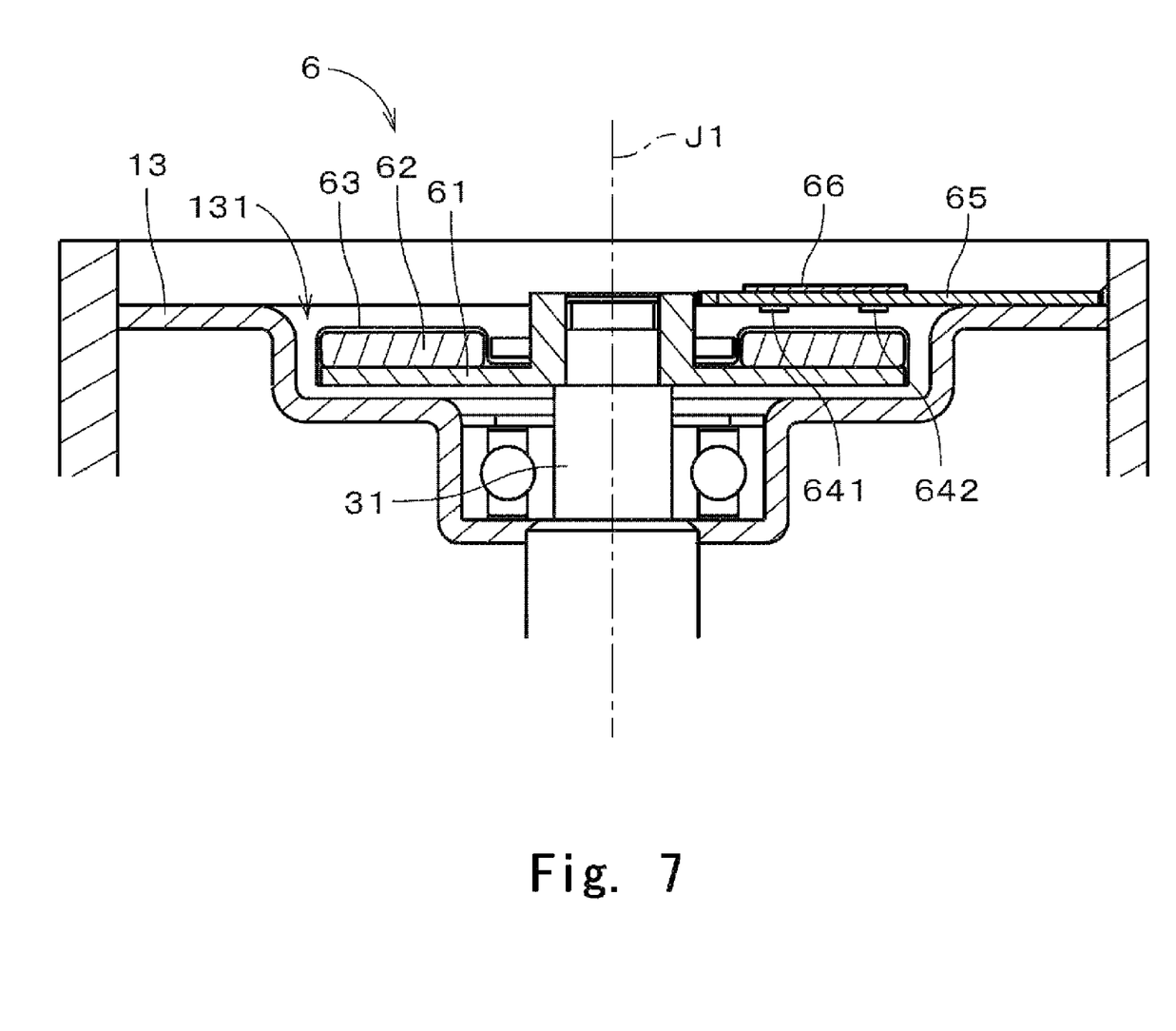
FIG. 7 is a schematic enlarged cross-sectional view of an area surrounding a sensor according to the first preferred embodiment of the present invention.

FIG. 7 is a schematic enlarged cross-sectional view of an area surrounding the sensor 6. As shown in FIG. 7, the sensor 6 preferably includes a yoke 61 affixed to the shaft 31, the sensor magnet 62 affixed at the yoke 61 and affixed indirectly to the shaft 31, and a magnet cover 63 which covers a surface of the sensor magnet 62 other than a portion in contact with the yoke 61. To be more specific, the yoke 61 preferably has a substantially annular shape arranged substantially perpendicularly to the central axis J1 and is made of a magnetic material. The sensor magnet 62 preferably has a substantially annular shape and is arranged substantially perpendicularly to the central axis J1. The magnet cover 63 is preferably made of a nonmagnetic material and is affixed to the yoke 61. The magnet cover 63 is preferably made of a metal material (aluminum in the present preferred embodiment). The magnet cover 63 may be made of a nonmagnetic stainless material. The yoke 61, sensor magnet 62, and the magnet cover 63 are preferably accommodated in the first concave portion 131 of the lid portion 13.

Figure 8:
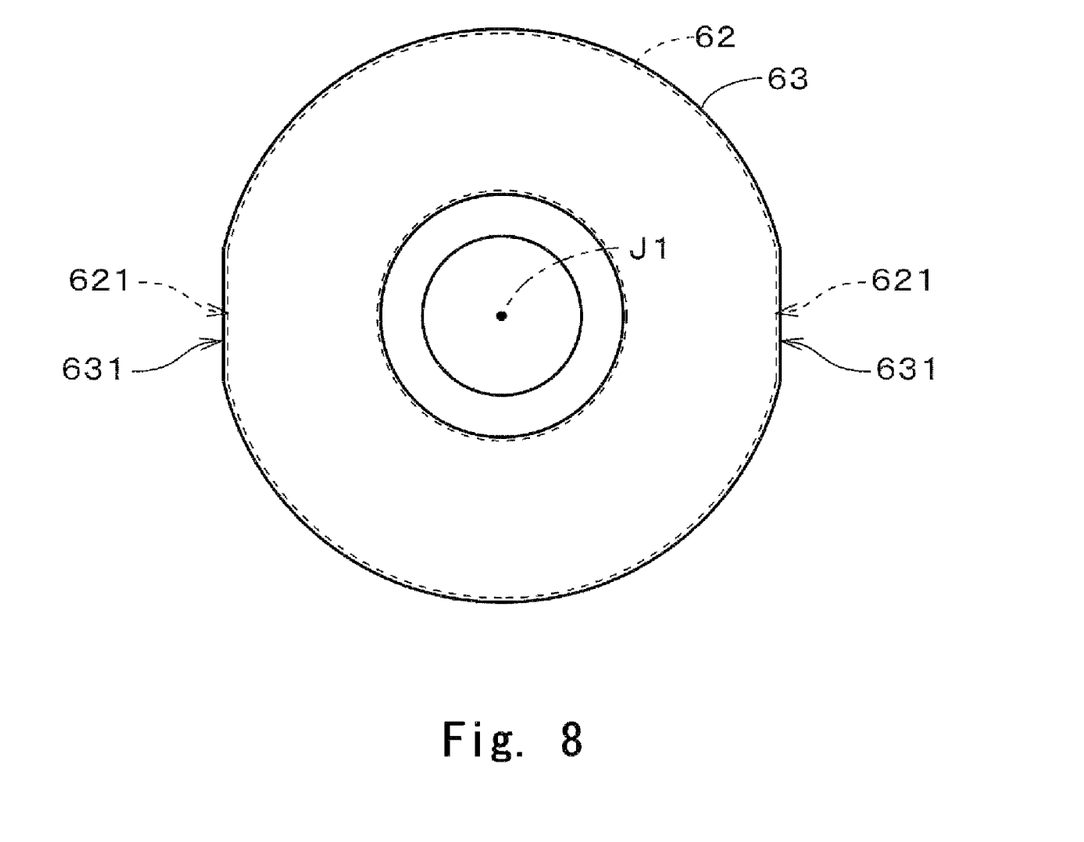
FIG. 8 is schematic plan view of a magnet cover and a sensor magnet according to the first preferred embodiment of the present invention.

FIG. 8 is a schematic plan view of the magnet cover 63 and the sensor magnet 62. As shown in FIG. 8, the sensor magnet 62 preferably includes at least one (for example, two in the present preferred embodiment) notched portion 621 at which an outer circumferential line of the sensor magnet 62 includes a straight line when viewed from above. Also, the magnet cover 63 preferably includes at least one (for example, two in the present preferred embodiment) flat surface portion 631 at an area corresponding to the notched portion 621. According to the sensor 6 of the present preferred embodiment, the notched portions 621 and the flat surface portions 631 make up a pair of engagement portions each restricting a circumferential movement of one another.

As shown in FIG. 7, the sensor 6 preferably includes the first Hall elements 641, the second Hall elements 642, a circuit board 65, and a back yoke 66. The first Hall elements 641 and the second Hall elements 642 are preferably arranged at an upper surface of the sensor magnet 62 whereas the yoke 61 is preferably arranged at a lower surface. The circuit board 65 is preferably arranged above the first Hall elements 641 and the second Hall elements 642. To be more specific, the first Hall elements 641 and the second Hall elements 642 are preferably affixed at a bottom surface of the circuit board 65 axially opposite to the sensor magnet 62. The back yoke 66 is preferably a plate member made of a magnetic material affixed at a top surface of the circuit board 65 via an insulating member. Note that the circuit board 65 is arranged axially above the first Hall elements 641 and the second Hall elements 642. An axial thickness of the back yoke 66 is preferably greater than approximately 0.5 mm, for example.

The circuit board 65 preferably has, as shown in FIG. 2, a substantially semicircular shape. Also, the circuit board 65, as shown in FIG. 7, is preferably affixed at a top surface of the lid portion 13 while preferably covering a portion of the first concave portion 131.

The sensor 6 preferably includes, as described above, for example, three first Hall elements 641 which are arranged so as to be spaced evenly apart from one another circumferentially centered about the central axis J1. Also, the sensor 6 preferably includes, for example, two second Hall elements 642 which are arranged radially outward of the first Hall elements 641 in the circumferential direction (that is, a distance between the first Hall elements 641 and the central axis J1 is different from a distance between the second Hall elements 642 and the central axis J1). According to the present preferred embodiment, each second Hall element 642 preferably includes two Hall elements, for example, and is a magnetic encoder.

Figure 9:
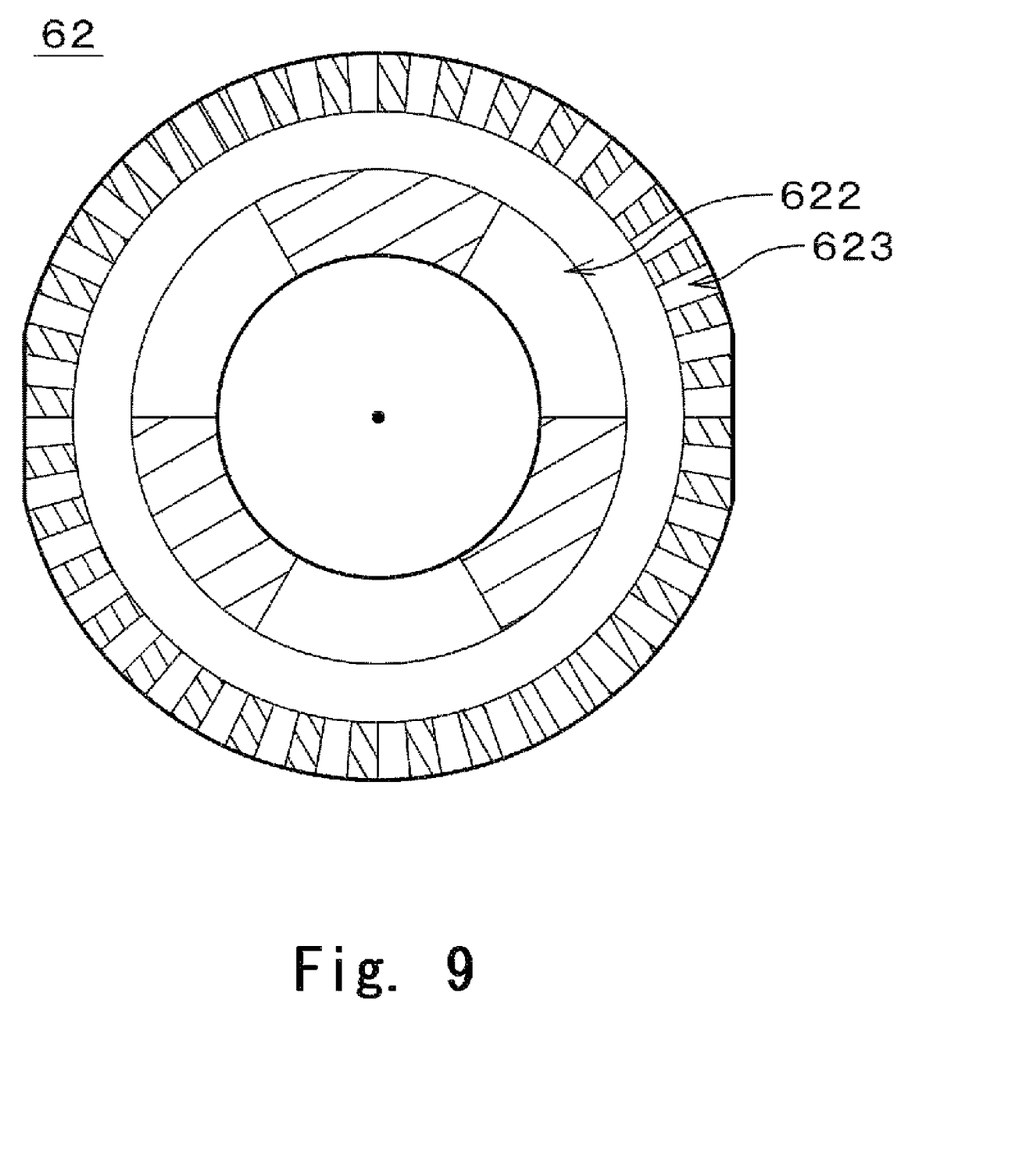
FIG. 9 is a schematic plan view of magnetic poles of the sensor magnet according to the first preferred embodiment of the present invention.

FIG. 9 is a schematic plan view of a magnet pole when viewed from an upper surface of the sensor magnet 62 (i.e., magnetized surface). Note that for clarity of depiction, diagonal lines are indicated to denote a north magnetic pole. As shown in FIG. 9, the sensor magnet 62 preferably includes a first domain 622 preferably having a substantially annular shape which is arranged opposite to the first Hall elements 641 (see FIG. 7) when the sensor magnet 62 rotates, and a second domain 623 preferably having an annular shape which is arranged opposite to the second Hall elements 642 (see FIG. 7). Note that a number of the magnetic poles of the first domain 622 is different from a number of the magnetic poles of the second domain 623. According to the present preferred embodiment, the number of the magnetic poles of the first domain 622 and that of the second domain 623 are preferably six and seventy-two, respectively, for example.

According to the motor 1 of the present preferred embodiment, when the rotor core 32 of the rotor portion 3 shown in FIG. 3 rotates, the sensor magnet 62 of the sensor 6 shown in FIG. 7 rotates along with the shaft 31 and the rotor core 32. When the sensor magnet 62 rotates, the first Hall elements 641 and the second Hall elements 642 sense the magnetic poles of the first domain 622 and the second domain 623. Then, based on an output from the first Hall elements 641 and the second Hall elements 642, an angular position centered about the central axis J1 of the rotor core 32 is detected with respect to the armature 21.

As described above, since the busbar unit 5 includes the relay 54, the connection between the armature 21 and the relay 54 is less likely to be damaged. By virtue of such a configuration, the connection between the armature 21 and the relay 54 is improved, thereby improving the reliability of the motor 1. Consequently, the reliability of the power steering unit 8 is improved. Also, since the relay 54 is arranged at the inner circumferential surface of the housing 11 via the adhesive layer 541 which has elasticity, shocks and vibrations transmitted to the motor 1 are less likely to be transmitted to the relay 54, thereby improving the reliability of the motor 1 while minimizing the risk of damaging the relay 54.

According to the busbar unit 5 of the present preferred embodiment, the plurality of first busbars 51 and the plurality of second busbars 52 are arranged so as to be spaced circumferentially apart from one another. By virtue of such a configuration, the first busbars 51 and the second busbars 52 are not arranged to overlap in the radial and the axial directions. Therefore, the motor 1 and the busbar unit 5 can have small dimensions in the axial and radial directions.

Conventionally, since a motor having a relay tends to include more busbars than a motor not having a relay, the motor having the relay becomes larger in size than the motor not having the relay. On the other hand, according to the motor 1 of the present preferred embodiment, since the first busbars 51 and the second busbars 52 do not overlap in the axial and radial directions, the busbar unit 5 can have a small dimension despite the relay 54. By virtue of such a configuration, the configuration of the motor 1 is particularly suitable for including a relay.

According to the busbar unit 5 of the present preferred embodiment, since the plurality of first busbars 51 each include a portion overlapping in the radial direction, the busbar unit 5 and the motor 1 having therein the busbar 5 can have a smaller dimension than a busbar unit having a plurality of busbars overlapping in the axial direction. Also, according to the busbar unit 5 of the present preferred embodiment, since the plurality of second busbars 52 each include a portion overlapping in the radial direction, the busbar unit 5 and the motor 1 having therein the busbar unit 5 can have a smaller dimension than a busbar unit having a plurality of busbars overlapping in the axial direction.

A motor used in a vehicle such as a passenger car is expected to operate reliably in various types of environments and to withstand vibrations and/or shocks applied to the motor. Also, the motor used for the purposes mentioned above is expected to have small dimensions for various environmental concerns including fuel efficiency and reduced emission of carbon dioxide. The motor 1 as described above is able to achieve high reliability and have reduced dimensions particularly suitable for use in a vehicle such as a passenger car.

The busbar unit 5 preferably includes a portion of the plurality of first busbars 51 and a portion of the plurality of second busbars 52 arranged in the groove portion 531 at an outer side of the busbar holder 53; and the rest of the first busbar 51 and the rest of the second busbar 52 are preferably arranged at the groove portion 531 arranged at an inner side of the busbar holder 53. By virtue of such a configuration, the busbar unit 5 and the motor 1 having therein the busbar unit 5 can have small dimensions, and the configuration of the busbar holder 53 is simplified.

Also, according to the present preferred embodiment, the number of the first busbars 51 and the number of the second busbars 52 each equal the number of phases of the drive current, and one terminal is arranged per each busbar. By virtue of such a configuration, the first busbar 51 and the second busbar 52 can be small in the circumferential direction, and the configuration of the first busbar 51 and that of the second busbar 52 are simplified. In particular, when the number of the drive currents of the motor 1 is as low as three, each busbar has a remarkably small dimension in the circumferential direction when the first busbar 51 and the second busbar 52 are configured as described above.

The connecting wire portion 2131 which is preferably arranged between the coils 213 and the busbar unit 5 is preferably covered in the radially inward direction by the first inner side protruding portion 2121 of the insulator 212 and the second inner side protruding portion 532 of the busbar holder 53. By virtue of such a configuration, the connecting wire portion 2131 makes no contact with the rotor core 32. Also, since the axial distance between the first inner side protruding portion 2121 and the second inner side protruding portion 532 is smaller than the diameter of the connecting wire portion 2131, the connecting wire portion 2131 makes no contact with the rotor core 32.

According to the motor 1 of the present preferred embodiment, since the axially top end of the first inner side protruding portion 2121 is arranged above an upper end of the coil 213, even when the motor 1 is turned upside down with the first inner side protruding portion 2121 facing downwardly onto a workbench or the like in order to work on the armature 21, the coil 213 makes no contact with the workbench. By virtue of such a configuration, the coils 213 are less likely to be damaged when manufacturing the motor 1. Also, since the axially top end of the outer side protruding portion 2122 is arranged above an upper end of the coils 213, the coils 213 are not damaged when the motor 1 is turned upside down onto the workbench.

Figure 10:
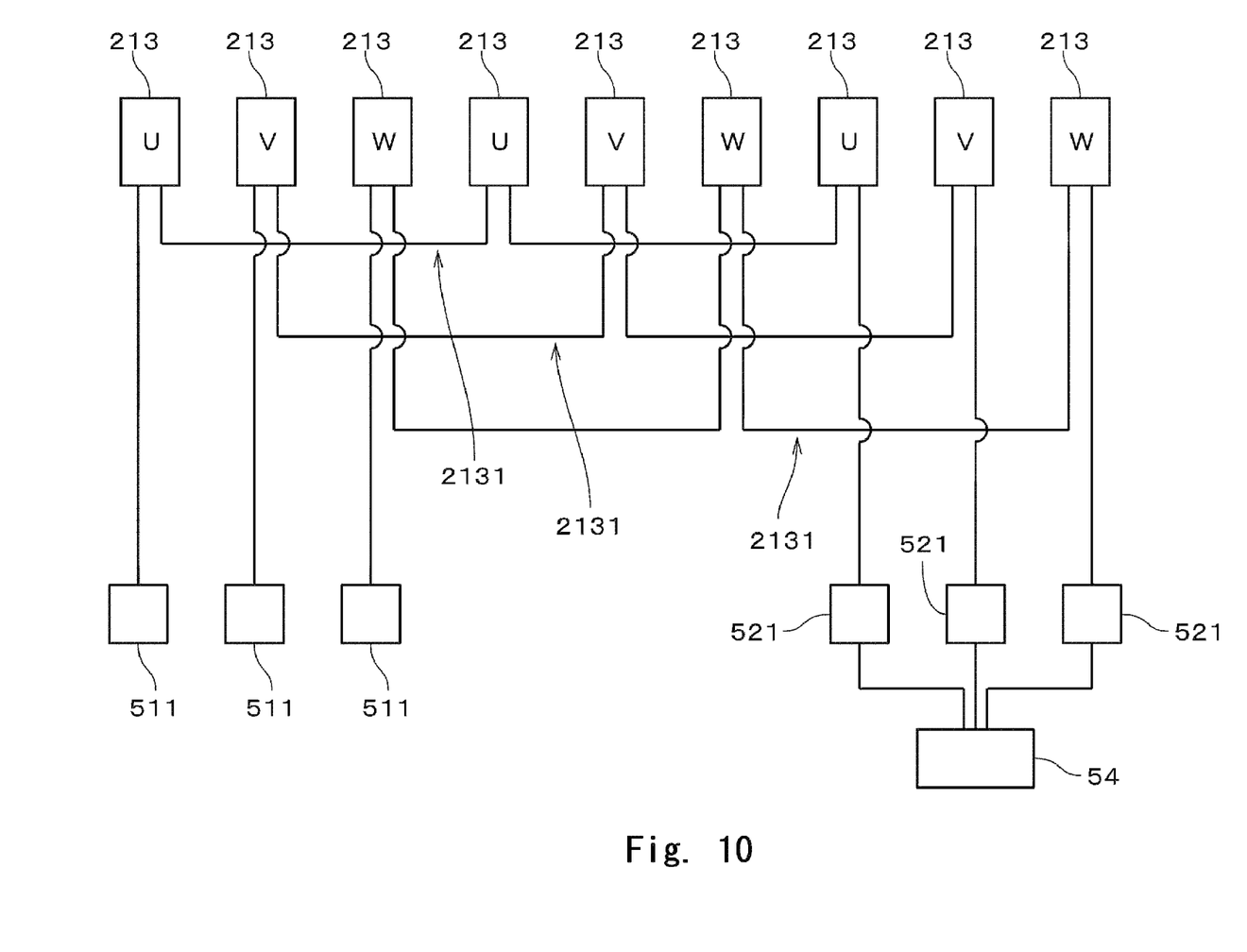
FIG. 10 is a schematic diagram of connections between coils, connecting wire portions, and terminals of a motor according to a second preferred embodiment of the present invention.

Hereinafter, a motor 1 according to a second preferred embodiment of the present invention will be described. FIG. 10 is a schematic diagram of connections between a plurality of coils, corresponding connecting portions, and terminals of the motor 1 according to the second preferred embodiment. As shown in FIG. 10, according to the motor 1 of the second preferred embodiment, three coils 213 corresponding to the three phases (e.g., U, V, and W phases) of the drive current are arranged in a series manner. Other configurations and elements similar to those described in the first preferred embodiment will be denoted by similar reference numerals, and description thereof is omitted.

The armature 21 according to the second preferred embodiment preferably includes a plurality (nine in the present preferred embodiment) of coils 213 which are formed by winding the wire in a concentrated manner around corresponding teeth 2112. In the motor 1, three coils 213 corresponding to the U-phase of the drive current, three coils 213 corresponding to the V-phase of the drive current, and three coils 213 of the drive current are connected in a series manner to corresponding electrodes of the external power source. The plurality of connecting wire portions 2131 are, as shown in FIG. 5, arranged in the space between the coils 213 and the busbar unit 5.

According to the motor 1 of the second preferred embodiment, since the busbar unit 5 which is, along with the armature 21, preferably accommodated in the housing 11 as in the first preferred embodiment includes the relay 54 (see FIG. 3), the reliability of the connection between the armature 21 and the relay 54 is improved thereby improving the reliability of the motor. In the busbar unit 5 according to the present preferred embodiment, the plurality of first busbars 51 and the plurality of second busbars 52 are arranged apart from one another in the circumferential direction. By virtue of such a configuration, the first busbars 51 and the second busbars 52 do not overlap in the axial and the radial directions, therefore reducing the dimensions of the busbar unit 5 and the motor 1 having therein the busbar unit 5.

Also, since the connecting wire portions 2131 are arranged in the space between the coils 213 and the busbar unit 5, the connecting wire portions 2131 are easily arranged. Consequently, the manufacturing process of the motor 1 is simplified.

According to the motor 1 of the second preferred embodiment, the coils 213 are formed by winding the wire in a concentrated manner around the corresponding teeth 2112, and are connected in series to the external power source. That is, preferably nine coils 213 are formed by three wires, for example, wherein only one wire is connected to the first terminal 511 of each first busbar 51 and the second terminal 521 of each second busbar 52. By virtue of such a configuration, the configuration of the first busbar 51 and of the second busbar 52 is simplified. Also, the first busbar 51 and the second busbar 52 are arranged easily at the busbar holder 53, which simplifies the wiring of the connecting wire portion 2131.

While preferred embodiments have been described in detail, the foregoing description is in all aspects illustrative and not restrictive. It is understood that numerous modifications and variations can be devised without departing from the scope and spirit of the invention.

Although preferred embodiments above describe that the second inner side protruding portion 532 of the busbar holder 53 preferably has a substantially annular shape, the present invention is not limited thereto. For example, a plurality of second inner side protruding portions, each protruding toward the first inner side protruding portions 2121, may be arranged circumferentially centered about the central axis J1.

Also, although preferred embodiments above describe that the motor 1 preferably includes the first inner side protruding portion 2121 and the second inner side protruding portion 532, the present invention is not limited thereto. At least one of the busbar holder 53 of the busbar unit 5 and the insulator 212 of the armature 21 may include an inner side protruding portion preferably having a substantially annular shape which is arranged to protrude radially inward of the coils 213. The inner side protruding portion preferably covers the radially inner side of the connecting wire portions 2131. Note that it is preferable that the inner side protruding portion is arranged at a side of the insulator 212 in order to minimize the risk of poorly formed coils 213, and to protect the coils 213.

Figure 11:
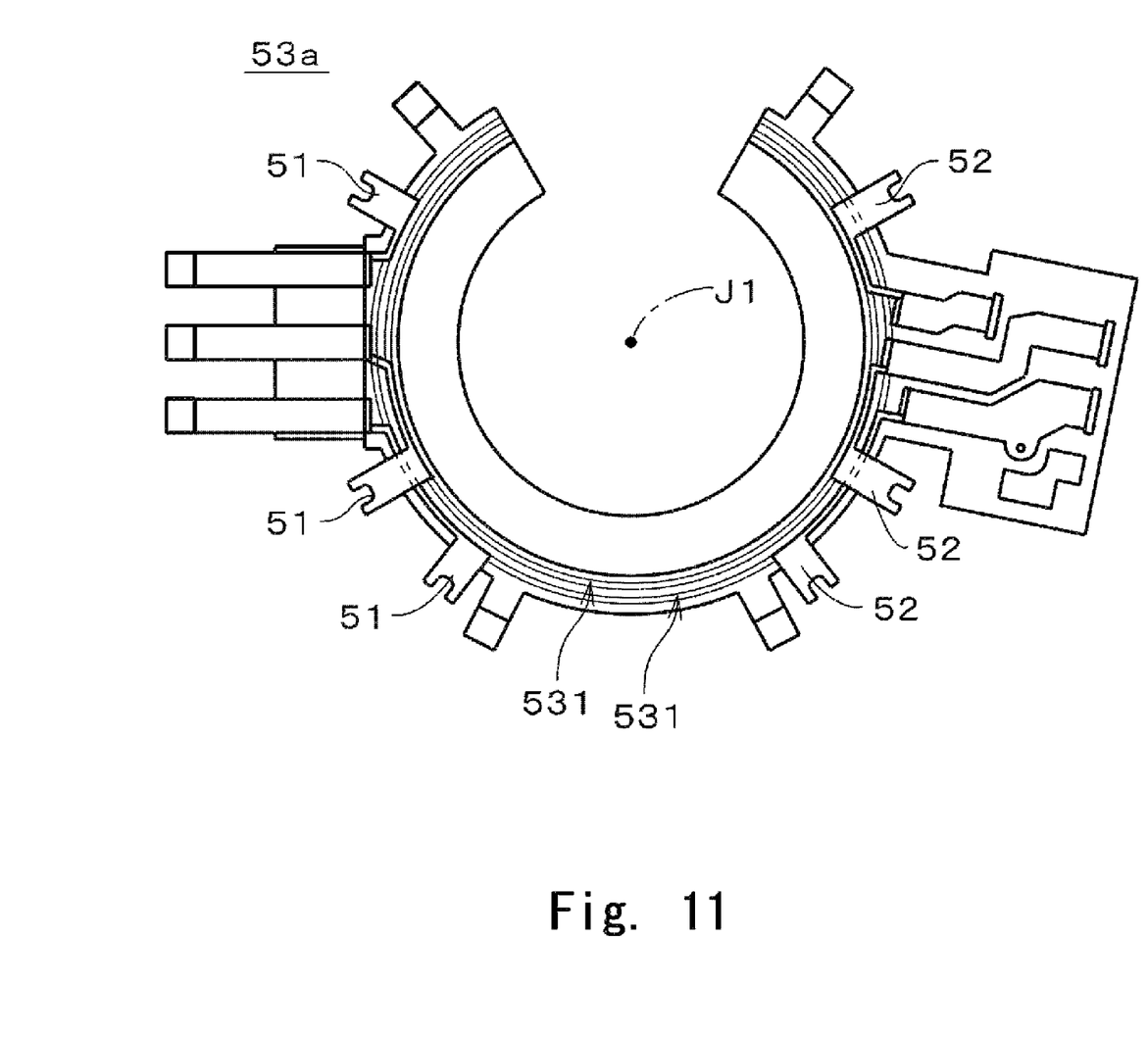
FIG. 11 is a schematic plan view of a busbar unit of another preferred embodiment of the present invention.

Although preferred embodiments above describe that the shape of the busbar holder 53 preferably includes a substantially annular shape centered about the central axis J1, the present invention is not limited thereto. As shown in FIG. 11, the busbar holder 53a may include, for example, a substantially arcuate shape centered about the central axis J1. According to the busbar holder 53a, the groove portion 531 in which the first busbars 51 and the second busbars 52 are accommodated preferably includes the substantially arcuate shape centered about the central axis J1. Note that the first busbars 51 and the second busbars 52 may be formed integrally by an insert molding.

Also, in the busbar unit 5, although the first busbar 51 and the second busbar 52 each have a substantially arcuate shape, they may have a substantially discoid shape extending along the central axis J1. In such a case, the first busbars 51 and the second busbars 52 are arranged circumferentially apart from one another so as to reduce the dimensions of the busbar unit 5 and the motor having such a busbar unit in the axial and radial directions. Also, a portion of the first busbars 51 overlaps in the axial direction with a portion of other first busbars 51, and a portion of the second busbars 52 overlaps in the axial direction with a portion of other second busbars 52 in order to reduce the dimensions of the busbar unit 5 and the motor having such a busbar unit 5 in the radial direction.

The armature 21 may include a plurality of coils 213 formed by winding a wire in a distributed manner around the corresponding teeth 2112 of the stator core 211. Also note that although the preferred embodiments above describe that the stator core 211 includes the segment cores, the present invention is not limited thereto. Also note that the armature 21 may have a substantially rectangular shape.

Although the preferred embodiments above describe that the yoke 61 and the sensor magnet 62 are preferably arranged substantially perpendicularly to the central axis J1, the present invention is not limited thereto. The sensor magnet 62 and the yoke 61 may have a substantially cylindrical shape arranged substantially parallel with the central axis J1. In such a case, the Hall elements are arranged at a radially outer side of the sensor magnet and opposite thereto.

Although the preferred embodiments above describe that the sensor 6 includes the sensor magnet 62 and the Hall elements, the present invention is not limited thereto. For example, a resolver of a variable reluctance type may be used as a sensor. It is to be appreciated that since the sensor 6 includes the sensor magnet 62 and the Hall elements, the sensor 6 can be thin in the axial direction thereby reducing the dimensions of the motor.

Also note that the although the preferred embodiments above describe that the motor is preferably used to generate torque for a power steering unit, the present invention is not limited thereto.

What is claimed is:

1. A motor comprising:
   a stator portion including an armature;
   a rotor portion including a field magnet which generates, along with the armature, a torque centered about a central axis;
   a bearing mechanism rotatably supporting the rotor portion with respect to the stator portion centered about the central axis;
   a busbar unit arranged at one axial side of the motor to connect the armature to an external power source; and
   a housing accommodating therein the stator portion, the rotor portion, the bearing mechanism, and the busbar unit; wherein
   the armature includes:
      a plurality of teeth arranged in a circumferential direction centered about the central axis;
      an insulator arranged to cover a surface of each tooth; and
      a plurality of coils defined by a wire wound around corresponding teeth via the insulator;
   the busbar unit includes:
      a relay arranged to operate a control drive current conducted to the armature from the external power source;
      a plurality of first busbars arranged to connect the coils and the external power source;
      a plurality of second busbars arranged to connect the coils and the relay; and
      a busbar holder arranged to retain the first busbars and the second busbars in a non-contact manner between the first busbars and the second busbars;
      each first busbar includes at least one first terminal at which one end of each wire forming the coils is connected;
      each second busbar includes at least one second terminal at which another end of each wire forming the coils is connected; and
      the busbar holder has a substantially annular shape or a substantially arcuate shape centered about the central axis and is made of an insulating material.

2. The motor according to claim 1, wherein the first busbars each have a substantially arcuate shape centered about the central axis, the second busbars each have a substantially arcuate shape centered about the central axis, and the first busbar and the second busbar are arranged so as to be spaced apart from one another in a circumferential direction.

3. The motor according to claim 2, wherein a portion of the first busbar overlaps with a portion of another first busbar in an axial direction, and a portion of the second busbar overlaps with a portion of another second busbar in the axial direction.

4. The motor according to claim 2, wherein each of the first busbars and each of the second busbars include a substantially cylindrical surface facing inwardly in the radial direction and extending in the axial direction, a portion of the first busbar overlaps with a portion of another first busbar in an axial direction, and a portion of the second busbar overlaps with a portion of another second busbar in the axial direction.

5. The motor according to claim 4, wherein the busbar holder includes a plurality of groove portions having a substantially annular shape or a substantially arcuate shape centered about the central axis, and the first busbars and the second busbars are accommodated in corresponding ones of the groove portions.

6. The motor according to claim 4, wherein the coils are defined by the wire wound around each tooth in a concentrated manner, a portion of the coils are correspondingly connected in a parallel manner to a plurality of electrodes of the external power source, and a plurality of connecting wire portions which are portions of the wire connecting the coils to the first terminal and the coils to the second terminal are arranged at one axial side of the coils.

7. The motor according to claim 6, wherein a number of the first busbars and a number of the second busbars each equal a number of phases of a drive current conducted to the armature from the external power source, each of the first busbars includes a first terminal, and each of the second busbars includes a second terminal.

8. The motor according to claim 7, wherein the number of phases of the drive current is three, two of the three first busbars each include a portion overlapping each other in the radial direction, and two of the three second busbars each include a portion overlapping each other in the radial direction.

9. The motor according to claim 6, wherein the field magnet is arranged radially inward of the armature, at least one of the insulator and the busbar holder includes an inner side protruding portion arranged radially inward of the coils in a substantially annular manner and protruding toward at least one of the insulator and the busbar holder, and the inner side protruding portion covers a radially inner side of each connecting wire portion.

10. The motor according to claim 9, wherein at an end of the inner side protruding portion, an axial distance between the busbar holder and the insulator is smaller than a diameter of the connecting wire portion.

11. The motor according to claim 9, wherein the insulator includes the inner side protruding portion, and the end of the inner side protruding portion is nearer to the busbar holder than the coils.

12. The motor according to claim 4, wherein the coils are defined by the wire wound around each tooth in a concentrated manner, a portion of the coils are correspondingly connected in a series manner to a plurality of electrodes of the external power source, and a plurality of connecting wire portions which are a portion of the wire connecting the coils are arranged at one axial side of the coils.

13. The motor according to claim 12, wherein the field magnet is arranged radially inward of the armature, at least one of the insulator and the busbar holder includes an inner side protruding portion arranged radially inward of the coils in a substantially annular manner and protruding toward at least one of the insulator and the busbar holder, and the inner side protruding portion covers a radially inner side of each connecting wire portion.

14. The motor according to claim 13, wherein at an end of the inner side protruding portion, an axial distance between the busbar holder and the insulator is smaller than a diameter of the connecting wire portion.

15. The motor according to claim 13, wherein the insulator includes the inner side protruding portion, and the end of the inner side protruding portion is arranged nearer to the busbar holder than the coils.

16. The motor according to claim 1, wherein the insulator includes at a radially outer side of the coils an outer side protruding portion having a substantially annular shape protruding toward the busbar holder, and an end of the outer side protruding portion is arranged nearer to the busbar holder than the coils.

17. The motor according to claim 1, wherein the relay is arranged at an inner circumferential surface of the housing via an adhesive layer.

18. The motor according to claim 1, wherein the motor is arranged to assist operating a vehicle.

19. A vehicle comprising the motor according to claim 1.

* * * * *